US012595428B2

(12) United States Patent
Narayanaswamy et al.

(10) Patent No.: US 12,595,428 B2
(45) Date of Patent: Apr. 7, 2026

(54) PROCESS FOR DEPOLYMERIZATION OF SOLID MIXED PLASTIC

(71) Applicant: SABIC GLOBAL TECHNOLOGIES B.V., Bergen op Zoom (NL)

(72) Inventors: Ravichander Narayanaswamy, Bangalore (IN); Alexander Stanislaus, Bangalore (IN); Girish Koripelly, Bangalore (IN); Sivakumar Periyasamy, Bangalore (IN); Sadasivam Gopalakrishnan, Bangalore (IN); Ranjith Puthanveedu, Bangalore (IN); Anilkumar Mettu, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 153 days.

(21) Appl. No.: 18/257,944

(22) PCT Filed: Oct. 26, 2021

(86) PCT No.: PCT/IB2021/059903
§ 371 (c)(1),
(2) Date: Jun. 16, 2023

(87) PCT Pub. No.: WO2022/130052
PCT Pub. Date: Jun. 23, 2022

(65) Prior Publication Data
US 2024/0052250 A1 Feb. 15, 2024

Related U.S. Application Data

(60) Provisional application No. 63/127,872, filed on Dec. 18, 2020.

(51) Int. Cl.
*C10G 51/04* (2006.01)
*B01J 29/40* (2006.01)
(Continued)

(52) U.S. Cl.
CPC .............. *C10G 51/04* (2013.01); *B01J 29/40* (2013.01); *B01J 31/04* (2013.01);
(Continued)

(58) Field of Classification Search
None
See application file for complete search history.

(56) References Cited

U.S. PATENT DOCUMENTS 5,386,055 A * 1/1995 Lee .......................... C07B 37/06
585/801
8,664,458 B2 3/2014 Kumar et al.
(Continued)

FOREIGN PATENT DOCUMENTS

CN 108531208 9/2018
EP 2006355 6/2006
(Continued)

OTHER PUBLICATIONS

International Search Report and Written Opinion issued in corresponding International Application No. PCT/IB2021/059903 mailed Jan. 19, 2022.

*Primary Examiner* — Tam M Nguyen
(74) *Attorney, Agent, or Firm* — Norton Rose Fulbright US LLP

(57) ABSTRACT

Systems and methods for processing a plastic are disclosed. The system includes a feeding device in fluid communication with a cracking unit. A feed stream comprising a plastic is depolymerized in the feeding device at a depolymerization temperature to produce a hydrocarbonaceous wax stream. The hydrocarbonaceous wax stream is then cracked in the cracking unit. The cracking is conducted at a cracking temperature that is lower than, or the same as the depolymerization temperature.

14 Claims, 4 Drawing Sheets

200

(51) Int. Cl.
  *B01J 31/04*    (2006.01)
  *C10G 51/00*    (2006.01)

(52) U.S. Cl.
  CPC . *B01J 2531/845* (2013.01); *C10G 2300/1003*
    (2013.01); *C10G 2300/1088* (2013.01); *C10G*
      *2300/1096* (2013.01); *C10G 2300/4006*
                (2013.01)

(56)      References Cited

U.S. PATENT DOCUMENTS

| | | | |
|---|---|---|---|
| 2018/0002609 A1 | 1/2018 | Narayanaswamy | |
| 2019/0119191 A1 | 4/2019 | Streiff et al. | |
| 2019/0299491 A1 | 10/2019 | Stanislaus et al. | |
| 2024/0301302 A1* | 9/2024 | Narayanaswamy | . C10G 35/095 |

FOREIGN PATENT DOCUMENTS

| | | | | |
|---|---|---|---|---|
| EP | 2814909 | 12/2014 | | |
| JP | 2005154516 | 9/2009 | | |
| KR | 20120004685 A | * 1/2012 | ............ | B21C 23/08 |
| KR | 20120004685 U | * 6/2012 | ............ | B62D 1/065 |
| WO | WO 2013/036151 | 3/2013 | | |
| WO | WO 2013/081230 | 6/2013 | | |
| WO | WO-2020084522 A1 | * 4/2020 | ............... | C10L 1/08 |

* cited by examiner

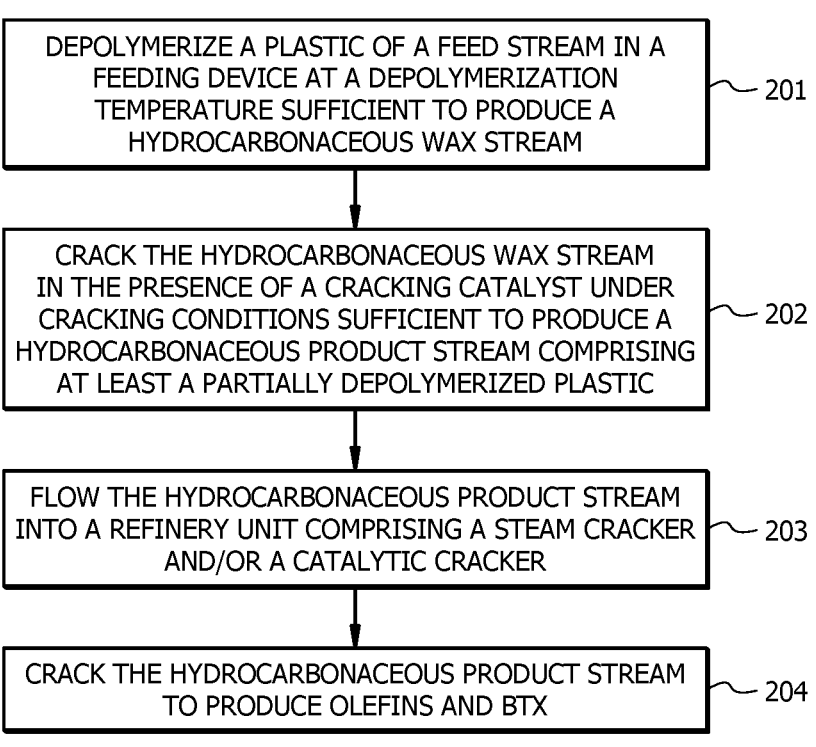

200

DEPOLYMERIZE A PLASTIC OF A FEED STREAM IN A
FEEDING DEVICE AT A DEPOLYMERIZATION
TEMPERATURE SUFFICIENT TO PRODUCE A
HYDROCARBONACEOUS WAX STREAM — 201

CRACK THE HYDROCARBONACEOUS WAX STREAM
IN THE PRESENCE OF A CRACKING CATALYST UNDER
CRACKING CONDITIONS SUFFICIENT TO PRODUCE A
HYDROCARBONACEOUS PRODUCT STREAM COMPRISING
AT LEAST A PARTIALLY DEPOLYMERIZED PLASTIC — 202

FLOW THE HYDROCARBONACEOUS PRODUCT STREAM
INTO A REFINERY UNIT COMPRISING A STEAM CRACKER
AND/OR A CATALYTIC CRACKER — 203

CRACK THE HYDROCARBONACEOUS PRODUCT STREAM
TO PRODUCE OLEFINS AND BTX — 204

*FIG. 2*

PROCESS FOR DEPOLYMERIZATION OF SOLID MIXED PLASTIC

CROSS REFERENCE TO RELATED APPLICATIONS

This application is a national phase under 35 U.S.C. § 371 of International Application No. PCT/IB2021/059903, filed Oct. 26, 2021, which claims the benefit of priority to U.S. Provisional Patent Application No. 63/127,872, filed Dec. 18, 2020, the entire contents of each of which are hereby incorporated by reference in their entirety.

FIELD OF INVENTION

The present invention generally relates to systems and methods for processing plastics. More specifically, the present invention relates to systems and methods for depolymerizing and cracking plastics to produce a feedstock that is usable for a refinery unit, a steam cracking unit, or a combination thereof.

BACKGROUND OF THE INVENTION

Waste plastics may be converted to high-value chemicals (e.g., olefins, aromatic hydrocarbons, etc.) via pyrolysis. However, plastics pyrolysis can yield product streams having a wide boiling range. For example, conventionally (under common pyrolysis process conditions), some pyrolysis product streams, including pyrolysis oil (pyoil) streams, are in liquid phase, while others are in gas phase. The liquid phase pyrolysis product streams are generally further cracked to increase the yield of high-value chemicals, while the gas phase high-value chemicals are flowed to separating units for recovery of high-value chemicals or feedstocks for making high-value chemicals.

Pyoil from conventional low severity pyrolysis of plastics generally contains about 20 to 40 wt. % olefins and about 10 wt. % aromatics. Therefore, the pyoil has to be saturated prior to being fed into a steam cracker whereas it is not necessary to saturate the pyoil for feeding to a fluid catalytic cracker (FCC unit) to produce high-value chemicals. It is more advantageous to feed the olefin containing material to an FCC unit for cracking. The steam cracker feed streams generally has less than 1 wt. % olefins. It is preferable that the aromatics in a (steam or catalytic) cracker feed are as low as possible in order to get high yields of high value chemicals (HVC) such as $C_2$ to $C_4$ olefins, benzene, toluene, xylenes (BTX) and ethyl benzene (EB). Therefore, a large amount of hydrogen is generally used in hydrogenating so that it results in high production cost for producing high value chemicals. Thus, preserving the hydrogen content of plastic in the feed in the product is important from a downstream potential to form high-value chemicals with low hydrogen consumption.

Furthermore, in commercially practiced processes, the overall carbon efficiency for cracking the pyoil obtained from plastics is relatively low with a yield of about 70% liquid products as a feed for downstream high-value producing units. Currently, methods for processing plastics generally use scale-limited modular equipment (leading to high capital cost), which has poor heat transfer and long residence times during pyrolysis of plastics, resulting in formation of high aromatics and gas products, loss of hydrogen from the molecules, higher coke formation, and loss of part of feedstock as coke. More specifically, for a process of producing light olefins, BTX, and EB to be commercial and economically viable by a large volume process such as steam cracker or FCC, the conversion process for converting solid plastic to liquid feedstock (for the above units) has to be scalable and continuous for lower capital cost. As plastics have relatively low heat capacities, to mitigate coke formation, efficient heat transfer and short residence time in the pyrolysis step are preferred which leads to higher production of hydrogen-rich liquid products. In addition, since coke and gas make are reduced the loss of Carbon in these products is low and this translates to higher carbon efficiency process for making liquid products from plastic conversion process.

Overall, while systems and methods for processing plastics to produce high valued chemicals exist, the need for improvements in this field persists in light of at least the aforementioned drawbacks for the conventional systems and methods.

BRIEF SUMMARY OF THE INVENTION

A solution to at least some of the above mentioned problems associated with systems and methods for processing plastics is discovered. The solution resides in a system and a method for processing a plastic. The method includes depolymerizing a plastic and then cracking the depolymerized plastics with a continuous process, thereby ensuring the commercial viability of the method. The depolymerizing or partial depolymerizing step before the cracking step can be beneficial for reducing residence time in the cracking step, thereby mitigating coke formation and increasing carbon efficiency for the overall process. Additionally, the cracking temperature with use of catalyst is lower than, the same as, or higher than the depolymerization temperature with control of residence time down to about one hour, further mitigating coke formation associated with long residence time and increasing carbon efficiency. Moreover, in the disclosed method, the feedstock from the plastic material can be transported and unloaded at a central processing facility as liquids at 100° C., thereby mitigating the difficulty for transporting low density waste plastics. Alternatively, if the plastic conversion unit is situated in a central processing facility, it provides the benefit of higher carbon efficiency and reduced footprint as compared to conventional modular units. Therefore, the systems and methods provide a technical solution to at least some of the problems associated with conventional systems and methods for processing plastics.

Embodiments of the invention include a method of processing a plastic. The method includes depolymerizing a plastic at a depolymerization temperature sufficient to produce a hydrocarbonaceous wax stream. The method further includes cracking the hydrocarbonaceous wax stream in the presence of a cracking catalyst under cracking conditions sufficient to produce a hydrocarbonaceous product stream comprising at least one of paraffins, isoparaffins, olefins, naphthenes and aromatic hydrocarbons. The cracking conditions include a cracking temperature that is lower than, the same as, or higher than the depolymerization temperature.

Embodiments of the invention include a method of processing a plastic. The method includes depolymerizing a plastic in a continuous feeding device at a thermal depolymerization temperature sufficient to produce a hydrocarbonaceous wax stream comprising components having an average molecular weight at least 20 times lower than an average molecular weight of components of the plastic. The method includes cracking the hydrocarbonaceous wax stream in the presence of a cracking catalyst under cracking conditions sufficient to produce a hydrocarbonaceous product stream comprising at least one of paraffins, isoparaffins, olefins, naphthenes and aromatic hydrocarbons. The hydrocarbonaceous wax stream has a normal boiling point at lower than 800° C. The cracking conditions include a cracking temperature that is lower than, the same as, or higher than the depolymerization temperature.

Embodiments of the invention include a system for processing a plastic. The system comprises a feeding device configured to depolymerize a plastic to produce a hydrocarbonaceous wax stream and continuously feed the hydrocarbonaceous wax stream to a cracking unit. The system comprises a cracking unit configured to crack components of the hydrocarbonaceous wax stream to produce a hydrocarbonaceous product stream comprising at least one of paraffins, isoparaffins, olefins, naphthenes and aromatic hydrocarbons. The cracking unit is configured to be operated at an operating temperature lower than, or the same as an operating temperature for the feeding device.

Embodiments of the invention include a method of processing a plastic. The method includes depolymerizing a plastic in a continuous feeding device at a thermal depolymerization temperature sufficient to produce a hydrocarbonaceous wax stream comprising components having an average molecular weight at least 20 times lower than an average molecular weight of components of the plastic. The residence time for depolymerization in the continuous feeding device is kept low, less than 1 hour and preferably less than 15 min, in order to limit exposure to high temperature and reduce the formation of aromatics, gas and coke. The method includes cracking the hydrocarbonaceous wax stream in the presence of a cracking catalyst under cracking conditions sufficient to produce a hydrocarbonaceous product stream comprising at least one of paraffins, isoparaffins, olefins, naphthenes and aromatic hydrocarbons. The hydrocarbonaceous wax stream has a normal boiling point at lower than 800° C. The cracking conditions include a cracking temperature that is lower than, same or higher than the depolymerization temperature. The residence time in the cracking step is reduced to less than 2 hours, preferably 1 hour or less to reduce aromatics, gas and coke. Overall conditions are utilized which reduce aromatics, gas and coke. The depolymerization rate in the continuous feeding device may optionally be enhanced with use of radical initiator such as an organometallic compound, a cracking catalyst, or a combination thereof. This will help in reducing the residence time in the feeding device and thus reduce aromatics, gas and coke further.

Embodiments of the invention include a catalyst for cracking a plastic and/or a hydrocarbonaceous wax stream to produce a hydrocarbonaceous product stream having a normal boiling point less than 800° C. The catalyst comprises an inorganic oxide, aluminosilicates including ZSM-5, an X-type zeolite, a Y-type zeolite, a USY-zeolite, mordenite, faujasite, nano-crystalline zeolites, MCM mesoporous materials, SBA-15, a silico-alumino phosphate, a gallium phosphate, a titanophosphate or molecular sieve, metal loaded aluminosilicate, or combinations thereof. The catalyst is configured to scavenge chlorides and enhance production of straight chain hydrocarbons over branched hydrocarbons.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The term "carbon efficiency," as that term is used in the specification and/or claims, means a percentage of carbon in liquid and gas products, except methane and coke, over the feed.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which:

FIG. 2 shows a schematic flowchart for a method of processing a plastic, according to embodiments of the invention;

DETAILED DESCRIPTION OF THE INVENTION

Currently, plastics derived pyoil produced using conventional low severity pyrolysis contains a large amount of olefins and aromatics, which requires hydrogenation before it is fed to a steam cracker. Therefore, high consumption of hydrogen is required for preparing the pyoil for subsequent cracking steps. Furthermore, the conventional methods for pyrolyzing plastics generally has poor heat transfer and long residence times, resulting in high aromatics and olefins in the pyoil, high coke formation, and low carbon efficiency. The present invention provides a solution to at least some of these problems. The solution is premised on a method of processing a plastic that includes a continuous process of depolymerizing and cracking plastics. This can be beneficial for ensuring commercial viability of the method. Additionally, the depolymerizing and/or partially depolymerizing step is capable of reducing residence time in the cracking step, thereby mitigating coke formation and increasing carbon efficiency of the plastics. Furthermore, the disclosed method is conducted with a cracking temperature that is lower than, or the same as the depolymerization temperature, further reducing coke formation and increasing carbon efficiency, compared to conventional methods. Moreover, the feedstock of the plastic material can be transported and unloaded at a central processing facility as liquids at 100° C., thereby mitigating the difficulty for transporting low density waste plastics. These and other non-limiting aspects of the present invention are discussed in further detail in the following sections.

A. System for Processing a Plastic

Figure 1:
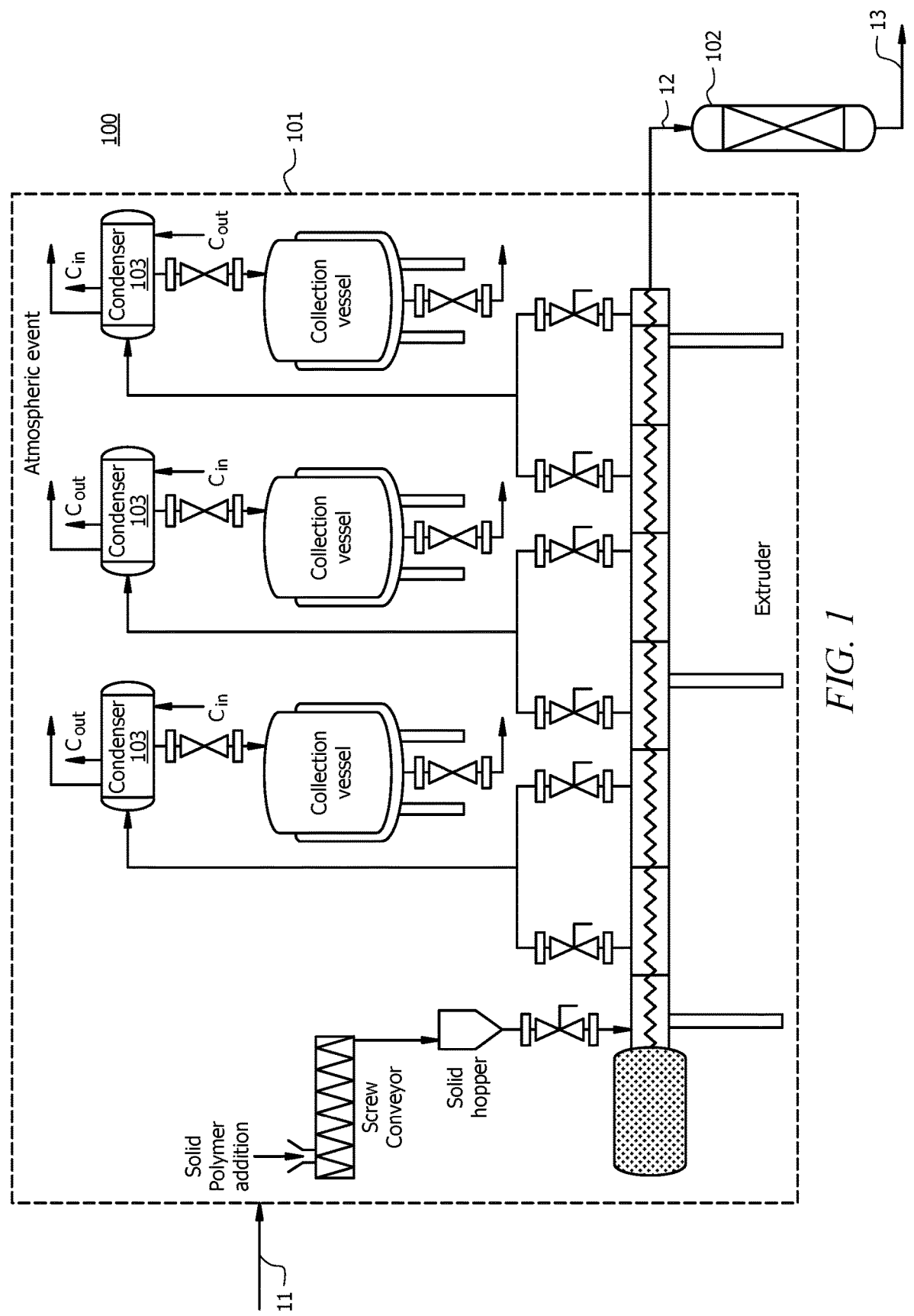
FIG. 1 shows a schematic diagram of a system for processing a plastic, according to embodiments of the invention.

In embodiments of the invention, the system for processing a plastic comprises a feeding device and a cracking unit. With reference to FIG. 1, a schematic diagram is shown for system 100, which is used for processing a plastic.

According to embodiments of the invention, system 100 includes feeding device 101 configured to depolymerize a plastic of feed stream 11 to produce hydrocarbonaceous wax stream 12. Feeding device 101 may be configured to depolymerize the plastic and form hydrocarbonaceous wax that has an average molecular weight of 20 to 50 times lower than the average molecular weight of components of the plastic. In embodiments of the invention, the plastic includes one or more polyolefins, one or more polystyrenes, one or more polyesters, one or more polyvinyl chloride, one or more polyamides, or combinations thereof. In embodiments of the invention, a liquid catalyst and/or additive are fed into feeding device 101. The liquid catalyst and/or additive are configured to accelerate the depolymerization rate in feed device 101 (e.g., a continuous feeding device) so that the targeted molecular weight reduction can be achieved at a reduced residence time. Exemplary liquid catalysts and/or additives can include an organometallic compound including octanoates and/or naphthenates of Ni, Mo, Co, W, transition metals, or a combination thereof. In embodiments of the invention, as an alternative or in addition to a liquid catalyst and/or additive, a solid catalyst and/or additive are fed into feeding device 101. The solid catalyst and/or additive are configured to accelerate depolymerization rate in feeding device 101 (a continuous feeding device) so that the targeted molecular weight reduction can be achieved at a reduced residence time. Exemplary solid catalysts may include an inorganic oxide, aluminosilicates including ZSM-5, an X-type zeolite, a Y-type zeolite, a USY-zeolite, mordenite, faujasite, nano-crystalline zeolites, MCM mesoporous materials, SBA-15, a silico-alumino phosphate, a gallium phosphate, and a titanophosphate, a molecular sieve, and combinations thereof. In embodiments of the invention, the liquid catalyst and/or the solid catalyst are configured to scavenge chlorides and enhance production of straight chain hydrocarbons over branched hydrocarbons. In embodiments of the invention, the solid catalyst and/or additive includes one or more loaded aluminosilicates configured to scavenging chlorides and/or enhance production of straight chain hydrocarbons over branched hydrocarbons. In embodiments of the invention, under depolymerization conditions in feeding device 101, naphthenates or octanoates decompose to the respective metal oxides, which are capable of scavenging chlorides present in polymer melt to form HCl. In embodiments of the invention, hydrocarbonaceous wax stream 12 may comprise the liquid catalyst and/or the solid catalyst. In embodiments of the invention feeding device 101 can include means for feeding a gas stream for purging components formed by partial depolymerization of plastic.

In embodiments of the invention, feeding device 101 can include an extruder, an auger, a screw feeder, a piston in a feed chamber, a block and feed type of manifold, or combinations thereof. Feeding device 101 can be a continuous feeding device. According to embodiments of the invention, feeding device 101 is equipped with an automated valving system. The automated valving system may be configured for gas pressurized discharge being operated in a timer-based pulse mode for mimicking continuous feeding. A continuous screw feeder can be used for metering the flow of plastics to the solid hopper of the extruder. In embodiments of the invention, the valve below the solid hopper is configured to be kept ON during operation and kept closed for maintenance. In embodiments of the invention, the metering feeder is configured to control through put of the extruder for varying residence times in the extruder. As an alternative to the screw feeder, a pressurized hopper with a rotary valving arrangement configured to operate on a timer based operation for mimicking continuous flow can be used. Timer of the rotary valve can be adjusted for different feeding rate to the extruder for changing residence time.

In embodiments of the invention, the pressurized hopper outlet includes two timer operation based solenoid valves in series connected by a pipe to feed solid hopper feeding into the extruder. The solenoid valves can be operated such that at any given time one solenoid valve is open. In embodiments of the invention, after certain time, the first valve closes and the second valve opens to feed the plastic to the solid hopper feeding into the extruder. The frequency of opening and closing these solenoid valve will determine the feeding rate and thus the residence time in the extruder. In embodiments of the invention the timer operation-based solenoid valves include block and manifold type automated valving.

In embodiments of the invention, feeding device 101 is equipped with heater control mechanism disposed along the length thereof. In embodiments of the invention, a combination of arrangement of screw elements is arranged to increase heat transfer of feeding device 101. Feeding device 101 may be configured to produce a tunable imposed temperature profile along the length thereof via controlled heaters. In embodiments of the invention, a gap between an outer rim of the screw and the extruder inner wall is less than 1 cm configured to limit plastic melt bypassing the screw of the extruder. The barrel to screw clearance can be as low as 0.15 mm. In embodiments of the invention, the extruder can include a gas inlet configured to provide continuous gas flow co-current to flow in the extruder and to remove cracked gas, hydrogen chloride, other hetero-atom containing volatiles formed in the extruder to reduce formation of organic chlorides by recombination. In embodiments of the invention, the hetero-atom volatiles besides organic chlorides can include ammonia, organic amines, nitro-compounds, hydrogen cyanide, oxygen containing compounds, or combinations thereof. The gas can include hydrogen, methane, ethane, propane, butane, $C_2$ to $C_4$ olefins, higher hydrocarbons, cracked gases from feeding device 101, nitrogen, or combinations thereof.

In embodiments of the invention, feeding device 101 includes a devolatization extruder. The devolatization extruder may comprise gas withdrawal pipelines with a heater control disposed along the length thereof. In embodiments of the invention, the withdrawal pipelines are in fluid communication with one or more condensers 103 configured to condense gas product from the extruder body. Uncondensed portion of the gas product, in embodiments of the invention, may be scrubbed, utilized as a cracker feedstock in a cracking unit, or combusted as a fuel. In embodiments of the invention, the devolatization extruder contains screws comprising a screw element including a left handed screw element, a right handed screw element, a neutral screw element, a kneading screw element, a conveying screw element, or combinations thereof.

In embodiments of the invention, feeding device 101 includes an auger reactor with a single conveying shaft with grooves to facilitate mixing and forward conveying of components in feeding device 101. In embodiments of the invention, feeding device 101 includes an auger reactor with a double helical conveying shaft configured to facilitate mixing, kneading, and forward conveying of the reactor content.

According to embodiments of the invention, an outlet of feeding device 101 is in fluid communication with an inlet of cracking unit 102 such that hydrocarbonaceous wax stream 12 flows from feeding device 101 into cracking unit 102. In embodiments of the invention, cracking unit 102 is configured to crack components of hydrocarbonaceous wax stream 12 to produce hydrocarbonaceous product stream 13 comprising at least a partially depolymerized plastic. In embodiments of the invention, cracking unit 102 comprises a fixed bed reactor, a fluidized bed reactor, rotary kiln. The fixed bed reactors may comprise the solid catalyst. The fluidized bed reactor comprises the solid catalyst. In embodiments of the invention, cracking unit 102 includes one or more continuous stirred tank reactors in fluid communication with a distillation column and or a gas-liquid or gas/liquid-liquid separator. In embodiments of the invention, cracking unit 102 can comprise one or more tubular reactors. In embodiments of the invention, cracking unit 102 and feeding device 101 are connected via a temperature controlled duct. In embodiments of the invention, hydrocarbonaceous product stream 13 is suitable as a feedstock for a steam cracking unit and/or a catalytic cracking unit.

In embodiments of the invention, system 100 includes one or more guard beds installed upstream and/or downstream to cracking unit 102. The guard beds are configured to remove metal and/or non-metal components from hydrocarbonaceous wax stream 12 and/or hydrocarbonaceous product stream 13. In embodiments of the invention, the one or more guard beds comprise alumina with high surface area as an adsorbent. The alumina of the guard beds may have a surface area from 50 $m^2$/g to 400 $m^2$/g mm and all ranges and values there between including ranges of 50 to 100 $m^2$/g, 100 to 150 $m^2$/g, 150 to 200 $m^2$/g, 200 to 250 $m^2$/g, 250 to 300 $m^2$/g, 300 to 350 $m^2$/g, 350 to 400 $m^2$/g.

B. Method of Processing a Plastic

Methods of processing a plastic have been discovered. As shown in FIG. 2, embodiments of the invention include method 200 for processing a plastic, with improved carbon efficiency to product that comprises lower concentrations of aromatics compared to conventional methods. Method 200 may be implemented by system 100, as shown in FIG. 1, and described above.

According to embodiments of the invention, as shown in block 201, method 200 includes depolymerizing a plastic of feed stream 11 in feeding device 101 at a depolymerization temperature sufficient to produce hydrocarbonaceous wax stream 12. In embodiments of the invention, feed stream 11 further comprises a depolymerization additive. The depolymerization additive may include a radical initiator comprising an organometallic compound, a cracking catalyst, or a combination thereof. The organometallic compound can include a metal octanoate, metal naphthenate, metal stearates, or combination thereof. The metal can include Ni, Mo, Co, W, transition metals, or a combination thereof. The depolymerization additive can be configured to accelerate rate of depolymerization in the feeding device 101.

Depolymerizing at block 201 further produces cracked gases. In embodiments of the invention, hydrocarbonaceous wax stream 12 has an average molecular weight of at least 20 times lower than the average molecular weight of components of the plastic of feed stream 11. At block 201, feeding device 101 is operated at a residence time of less than 1 hour, preferably less than 15 minutes. In embodiments of the invention the depolymerization temperature is in a range of 300 to 500° C. and all ranges and values there between including ranges of 300 to 320° C., 320 to 340° C., 340 to 360° C., 360 to 380° C., 380 to 400° C., 400 to 420° C., 420 to 440° C., 440 to 460° C., 460 to 480° C., and 480 to 500° C.

In embodiments of the invention, at block 201, feeding device 101 includes a devolatization extruder and the depolymerizing step further includes condensing at least a portion of the cracked gas, scrubbing to remove acid gases and then utilizing the uncondensed portion of the cracked gas as a cracking feedstock to produce light gas olefins, or combusting the uncondensed portion of the cracked gas as a fuel.

According to embodiments of the invention, as shown in block 202, method 200 includes cracking hydrocarbonaceous wax stream 102 in the presence of the cracking catalyst under cracking conditions sufficient to produce hydrocarbonaceous product stream 13 comprising at least a partially depolymerized plastic. In embodiments of the invention, hydrocarbonaceous product stream 13 comprises one or more of paraffins, isoparaffins, olefins, naphthenes, and aromatic hydrocarbons. In embodiments of the invention, hydrocarbonaceous product stream 13 boils at a temperature lower than 800° C., preferably no more than 35° C., 35 to 750° C. and all ranges and values there between including ranges of 35 to 50° C., 50 to 100° C., 100 to 150° C., 150 to 200° C., 200 to 250° C., 250 to 300° C., 300 to 350° C., 250 to 300° C., 300 to 350° C., 350 to 400° C., 400 to 450° C., 450 to 500° C., 500 to 550° C., 550 to 600° C., 600 to 650° C., 650 to 700° C., and 700 to 750° C. In embodiments of the invention, components in hydrocarbonaceous product stream 13 have an average molecular weight of at least 3 times lower than the average molecular weight of depolymerized components in the hydrocarbonaceous wax stream 12. In embodiments of the invention, hydrocarbonaceous product stream 13 has a hydrogen content of more than 14 wt. %.

In embodiments of the invention, the cracking conditions include a cracking temperature that is lower than, or the same as the depolymerization temperature. The cracking temperature is in a range of 250 to 500° C. and all ranges and values there between including ranges of 250 to 265° C., 265 to 280° C., 280 to 295° C., 295 to 310° C., 310 to 325° C., 325 to 340° C., 340 to 355° C., 355 to 370° C., 370 to 385° C., 385 to 400° C., 400 to 415° C., 415 to 430° C., 430 to 445° C., 445 to 460° C., 460 to 475° C., 475 to 490° C. and 490 to 500° C., according to embodiments of the invention. In embodiments of the invention, at block 202, cracking conditions further include a residence time of less than 2 hours, preferably no more than 1 hour. In embodiments of the invention, hydrocarbonaceous product stream 13 comprises less than 10 wt. % aromatics, preferably less than 3 wt. % aromatics. Hydrocarbonaceous product stream 13 comprises less than 45 wt. % olefins.

According to embodiments of the invention, as shown in block 203, method 200 may include flowing hydrocarbonaceous product stream 13 into a refinery unit. The refinery unit can comprise a steam cracker and/or catalytic cracker. According to embodiments of the invention, as shown in block 204, method 200 includes cracking hydrocarbonaceous product stream 13 to produce olefins and BTX (benzene, toluene, and xylene). In embodiments of the invention, the cracking can include steam cracking and/or catalytic cracking. The hydrocarbonaceous product stream can be hydrogenated to saturate the olefins before feeding to steam cracker, whereas the hydrocarbonaceous stream can be fed to the catalytic cracking unit directly without hydrogenation.

Although embodiments of the present invention have been described with reference to blocks of FIG. 2, it should be appreciated that operation of the present invention is not limited to the particular blocks and/or the particular order of the blocks illustrated in FIG. 2. Accordingly, embodiments of the invention may provide functionality as described herein using various blocks in a sequence different than that of FIG. 2.

The systems and processes described herein can also include various equipment that is not shown and is known to one of skill in the art of chemical processing. For example, some controllers, piping, computers, valves, pumps, heaters, thermocouples, pressure indicators, mixers, heat exchangers, and the like may not be shown.

As part of the disclosure of the present invention, specific examples are included below. The examples are for illustrative purposes only and are not intended to limit the invention. Those of ordinary skill in the art will readily recognize parameters that can be changed or modified to yield essentially the same results.

Example 1

Study of Cracking Behavior of Mixed Plastics

Experiments were conducted with Gottfert Rheotester 2000 Capillary Rheometer to study the cracking behavior of mixed plastics containing HDPE 23.2 wt. %, LDPE 25.6 wt. %, LLDPE 22 wt. %, and PP 29.2 wt. % at various temperatures as a function of shear rate with a fixed dwell time of 5 min. The results are tabulated in Table 1. Some of the products were tested by Infrared (IR) spectrometry for aromatics formation and GPC (Gel-permeation Chromatography) for molecular weight. The results in Table 2 indicate no aromatic formation and a drop in molecular weight, but the drop in molecular weight was not significant. It was concluded that the severity was not sufficient for a significant drop in molecular weight and therefore the focus was shifted to carrying out experiments at a much higher severity and longer dwell time to enhance cracking.

TABLE 1

Capillary melt viscosity study over a range
of temperature from 250 to 360° C.
Apparent Viscosity and Shear rate

| Shear rate (s$^{-1}$) | 250° C. Pa · s (Pascal second) | 280° C. Pa · s | 300° C. Pa · s | 320° C. Pa · s | 360° C. Pa · s |
|---|---|---|---|---|---|
| 100 | 382 | 319 | 200 | 90 | 13 |
| 300 | 218 | 182 | 115 | 74 | 11 |
| 500 | 175 | 125 | 89 | 56 | 14 |
| 700 | 136 | 110 | 72 | 48 | 11 |
| 800 | 129 | 96 | 74 | 49 | 7 |
| 900 | 115 | 90 | 78 | 52 | 4 |
| 1000 | 105 | 86 | 81 | 56 | 6 |
| 1500 | 89 | 68 | 63 | 42 | 4 |
| 2000 | 67 | 61 | 51 | 40 | 3 |

TABLE 2

GPC of some samples entered in Table 1.

| Sample Name* | Mn (Number average Molecular weight) | Mw (Weight average Molecular weight) | Dispersity Index (Mw/Mn) |
|---|---|---|---|
| A-250-2000 | 20954 | 184855 | 8.82 |
| A-280-2000 | 21943 | 180948 | 8.25 |
| A-300-2000 | 21068 | 170447 | 8.09 |
| A-320-2000 | 18759 | 146416 | 7.81 |
| Mixed plastic used for the study | 42786 | 235259 | 5.50 |

(*Naming convention –250 is temperature in ° C. and 2000 is Shear in s$^{-1}$, higher DI value indicates presence of more fragments)

Example 2

Analysis of Cracking Behavior of Mixed Plastics

Although the experiment with the Rheometer did not result in aromatics, it did not significantly drop the molecular weight. This could be due to insufficient dwell time and lower temperature severity. To overcome this issue, experiments were planned using a Hakke Rheomix 600QC batch mixer that can operate at 400° C. Due to higher temperature severity and longer dwell time, higher cracking and hence lower molecular weight can be achieved.

Table 3 shows GPC results of product from Hakke Rheomix 600QC experiments carried out at 395° C. with a dwell time of 7 minutes and varying rpm. The drop in molecular weight from approximately 235259 to a few thousands was significant. Also, no aromatics were observed through IR analysis. The products had melting points in the range of 250-260° C. Due to the instrument's temperature limitation, experiments could not be carried out at higher severity and therefore further studies were carried out in a devolatization extruder.

TABLE 3

| | | | |
|---|---|---|---|
| | GPC results of product from Hakke experiments | | |
| Sample Name | Mn (Number average molecular weight) | Mw (Weight average molecular weight) | Dispersity Index (Mw/Mn) |
| A-DT7-50 | 1830 | 7619 | 4.16 |
| A-DT7-100 | 1733 | 7834 | 4.52 |
| A-DT7-150 | 2132 | 8838 | 4.15 |
| A-DT7-200 | 2497 | 10780 | 4.32 |

(*Naming convention - DT7 is dwell time 7 min and 200 is rpm)

Example 3

Study of Cracking of Mixed Plastics in a Devolatization Extruder

Cracking of mixed plastic was studied in a devolatization extruder at different temperature and at different feed rates as in Table 4 keeping the rpm fixed at 100.

The devolatization extruder used for the study is a co-rotating twin screw extruder (Type omega 30 series). The length of the barrel is 1472 mm and diameter of the screw is 29.7 mm (L/D=49.56). It consists of 12 devolatizing barrels which have proportional-controlled-derivative (PID) heating and cooling arrangement through programmable logic controller (PLC). Heating is done by switching solid-state relay to the control power to the heater assembled to the barrel and the cooling is achieved by passing nitrogen operated by solenoid valves.

The melt flowing out of the extruder was collected and analyzed for aromatics. IR analysis indicated no aromatics formation even at 450° C. GPC analysis of the samples showed a significant drop in molecular weight. Also, a relatively higher residence time results in better cracking and lower molecular weight. However, if the residence time is too high then it would lead to secondary reactions and hence formation of aromatics. Therefore, it is essential to keep the extruder conditions and residence time such that there was significant cracking and lowering of molecular weight but did not allow formation of new aromatics in the process.

Figure 3:
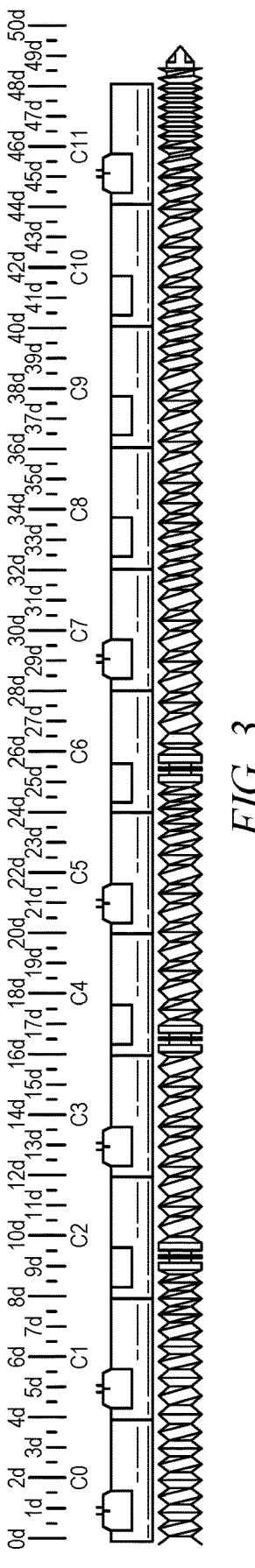
FIG. 3 shows a schematic of an extruder used as a feeding device, according to embodiments of the invention.

A schematic diagram of the devolatization extruder used is shown in FIG. 3. The C0 and C11 were barrel vents, where 6 vents were operational during the course of experiments. Screw to screw clearance is approximately 0.5 mm and barrel to screw clearance is approximately 0.15 mm. Multiple screw elements in the shaft acted as multiple Continuous Stirred Tank Reactor (CSTR) in series, which offered a plug flow kind of behavior that result in uniform residence time.

In addition, the high heat inventory in the barrel and the screw elements and rotation of the screw conducted the heat from the barrel wall to the material effectively thereby melting the polymer with very little bypass. Once the polymeric material is melted, less clearance between the screw and barrel helps in effective heat transfer to the melt along the length. Less clearance also helped in minimizing the film formation and continuously self-cleans itself, aiding the liquid to move forward. These features of the extruder helped minimize the secondary reactions that can cause aromatic formation at the wall during depolymerization as compared to conventional tank/kettle and kiln reactors.

Aromatic formation is also a function of residence time. The longer the residence time, the higher the chance of aromatic formation through secondary reactions. A close clearance between the screw and barrel is maintained which helps in better heat transfer through surface renewal and increasing the wall velocity. This led to minimal material stagnation across the length of the extruder, along the wall and hence lower residence time. The extruder vented gas is a mixture of condensable lighter hydrocarbon and non-condensable gas and accounts for the balance percentage of feed processed in the extruder. There was no coke observed.

TABLE 4

| | | | | |
|---|---|---|---|---|
| | | Results from extruder experiments | | |
| T, ° C. | RPM | MW (Molecular weight) | Feed Rate, Kg/hr | Hydrocarbonaceous was stream recovery wt. % |
| 430 | 100 | 5395 | 0.5 | 93 |
| 430 | 100 | 5454 | 0.76 | 93 |
| 430 | 100 | 7816 | 1.3 | 93 |
| 450 | 100 | 5827 | 1.1 | 88 |
| 450 | 100 | 7119 | 2 | 88 |

Example 4

Cracking of Extruder Output and Analysis on the Cracking Product 50 g of the extruder output at 450° C. at 100 rpm (1.1 kg/hr feed rate, 5827 mol. wt.) was charged into a round bottom flask along with 2.5 g of ZSM-5 commercial FCC additive and the mixture was cracked at 420° C. for 30 minutes with low headspace nitrogen purge. The liquid recovery was 90% with the balance evolved as gas. The product material was liquid at around 110° C. and is suitable to be transported from remote facility to a centralized facility. The results showed that the material had no aromatics.

Figure 4:
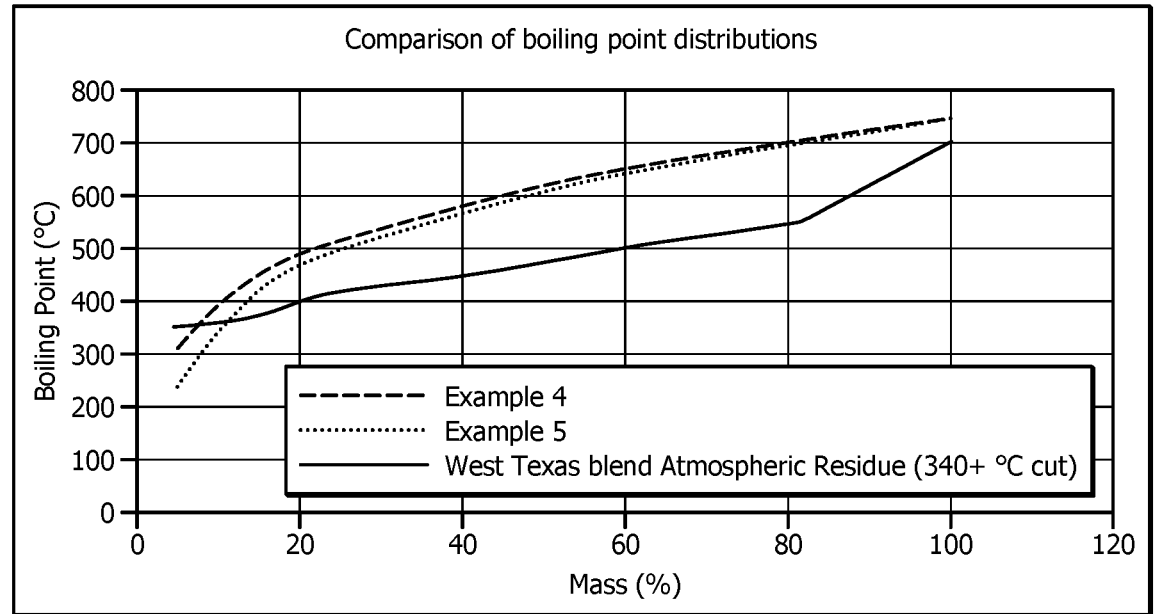
FIG. 4 shows results for boiling points for components in a product stream obtained in examples 4 and 5.

This product resembles crude oil but with a higher hydrogen content (14.6 wt. %). FIG. 4 shows the boiling point distribution of the liquid product obtained from Example 4 with that of Arab Light crude oil. This material obtained from Example 4 is suitable as a feed for refinery as synthetic crude oil.

Example 5

Cracking of Extruder Output and Analysis on the Cracking Product 50 g of the extruder output at 450° C. at 100 rpm (1.1 kg/hr feed rate, 5827 mol. wt.) was charged into a round bottom flask along with 2.5 g of cobalt octanoate (a representative liquid cracking catalyst from among metal naphthenates and octanoates) and the mixture was cracked at 420° C. for 30 min. The liquid recovery was about 95% (out of 52.5 g of material charged) with the balance evolved as gas. The product material was liquid at around 110° C. and is suitable to be transported from remote facility to a centralized facility. The material contained no aromatics. The cobalt octanoate (a representative liquid cracking catalyst from among metal naphthenates and octanoates) thus gives good cracking performance. This means, that it can be used in extruder along with plastics to accelerate the rate of depolymerization in the continuous feeding device. Similarly based on Example 4, ZSM-5 can also be added along with plastic feed in the extruder to accelerate the rate of depolymerization in the continuous feeding device.

TABLE 5

| Extruder Product Extruder product at 450 deg C. with 5 Wt % Co Octanoate, Reaction at 420 deg C. and 1 hr | |
| --- | --- |
| Mass % | Boiling Point, ° C. |
| 5 | 238.6 |
| 10 | 342 |
| 20 | 469.6 |
| 50 | 610.6 |
| 70 | 671.4 |
| 90 | 723 |
| 99 | 746.8 |
| 100 | 748.4 |

Table 5 shows the boiling point distribution of the liquid product obtained from Example 5 which is in the range of atmospheric residue from crude oil distillation ie in FIG. 4, the portion of the boiling curve corresponding to 50 to 100 mass %.

Examples 3 and 4 show that it is possible to generate liquid boiling in the petroleum crude oil range (up to 750° C.) with a combination of a thermal cracking step (extruder) and a catalytic cracking step with short residence time. Another obvious variation of this invention could be charging of solid catalyst with feed in the extruder or liquid catalyst with feed in the extruder under similar operating conditions.

Example 6

Cracking of Mixed Plastics and Analysis on the Cracking Product 150 g of the mixed plastics containing HDPE 23.2 wt. %, LDPE 25.6 wt. %, LLDPE 22 wt. %, and PP 29.2 wt. % was mixed with 7.5 g of 15% Mg on ZSM-5 and the reaction conducted in a round bottom flask at 420° C. for 45 min. An analysis of liquid products by detailed hydrocarbon analysis showed a paraffin to iso-paraffin ratio of 2.5 in the liquid products. This is important characteristic for maximizing ethylene yield in steam cracker. The Mg/ZSM-5 also helps in scavenging any chlorides present.

In the context of the present invention, at least the following 20 embodiments are described. Embodiment 1 is a method of processing a plastic. The method includes depolymerizing a plastic at a depolymerization temperature sufficient to produce a hydrocarbonaceous wax stream. The method further includes cracking the hydrocarbonaceous wax stream in the presence of a cracking catalyst under cracking conditions sufficient to produce a hydrocarbonaceous product stream containing at least a partially depolymerized plastic, wherein the cracking conditions include a cracking temperature that is lower than, or the same as the depolymerization temperature. Embodiment 2 is the method of embodiment 1, wherein the hydrocarbonaceous wax stream has an average molecular weight of at least 20 times lower than the average molecular weight of components of the plastic. Embodiment 3 is the method of any of embodiments 1 and 2, wherein the hydrocarbonaceous wax stream has an average molecular weight of 20 to 50 times lower than the average molecular weight of components of the plastic. Embodiment 4 is the method of any of embodiments 1 to 3, wherein the hydrocarbonaceous product stream has a boiling point lower than 800° C. Embodiment 5 is the method of any of embodiments 1 to 4, wherein the hydrocarbonaceous product stream contains at least one of paraffins, isoparaffins, olefins, naphthenes, aromatic hydrocarbons, or combinations thereof. Embodiment 6 is the method of any of embodiments 1 to 5, wherein the depolymerizing step is conducted in a continuous feeding device. Embodiment 7 is the method of any of embodiments 1 to 6, wherein the continuous feeding device is operated at a residence time of less than 1 hour. Embodiment 8 is the method of any of embodiments 1 to 7, wherein the continuous feeding device includes an extruder, an auger, a screw feeder, a piston in a feed chamber, a block and feed type manifold, or combinations thereof. Embodiment 9 is the method of any of embodiments 1 to 8, wherein the continuous feeding device is equipped with (1) automated valving configured for gas pressurized discharge being operated in a timer-based pulse mode for mimicking continuous feeding, and/or (2) heater control means disposed along the length thereof. Embodiment 10 is the method of any of embodiments 1 to 9, wherein the continuous feeding device includes a devolatization extruder including gas withdrawal pipelines with heater control means disposed along the length thereof, wherein the withdrawal pipelines are in fluid communication with one or more condensers configured to condense gas product from the extruder. Embodiment 11 is the method of any of embodiments 1 to 10, wherein the depolymerization temperature is in a range of 300 to 500° C., and the catalytic cracking temperature is in a range of 250 to 400° C. Embodiment 12 is the method of any of embodiments 1 to 11, further including feeding the hydrocarbonaceous product stream into a steam cracking unit and steam-cracking the hydrocarbonaceous product stream to produce olefins and aromatics. Embodiment 13 is the method of any of embodiments 1 to 12, wherein components in the hydrocarbonaceous product stream have an average molecular weight of at least 3 times lower than the average molecular weight of the depolymerized components in the hydrocarbonaceous wax stream. Embodiment 14 is the method of any of embodiments 1 to 13, wherein the cracking catalyst contains an inorganic oxide, aluminosilicates including ZSM-5, an X-type zeolite, a Y-type zeolite, a USY-zeolite, mordenite, faujasite, nano-crystalline zeolites, MCM mesoporous materials, SBA-15, a silico-alumino phosphate, a gallium phosphate, a titanophosphate or molecular sieve, metal loaded aluminosilicate, or combinations thereof. Embodiment 15 is the method of any of embodiments 1 to 14, wherein the cracking catalyst contains Mg, Ni, Co, a transition metal, or combinations thereof.

Embodiment 16 is a system for processing a plastic. The system includes a feeding device configured to depolymerize a plastic to produce a hydrocarbonaceous wax stream and continuously feed the hydrocarbonaceous wax stream to a cracking unit. The system further includes a cracking unit configured to crack components of the hydrocarbonaceous wax stream to produce a hydrocarbonaceous product stream containing at least a partially depolymerized plastic, wherein the cracking unit is operated at an operating temperature lower than, or the same as an operating temperature for the feeding device. Embodiment 17 is the system of embodiment 16, further including one or more guard beds containing porous alumina, installed upstream and/or downstream to the cracking unit, wherein the guard beds are configured to remove metals and non-metals from the hydrocarbonaceous product stream. Embodiment 18 is the system of any of embodiments 16 and 17, wherein the feeding device includes one or more extruders. Embodiment 19 is the system of any of embodiments 16 to 18, wherein the cracking unit includes one or more catalytic reactors.

Embodiment 20 is a catalyst for cracking a plastic and/or a hydrocarbonaceous wax stream to produce a hydrocarbonaceous product stream boiling at less than 800° C. The catalyst includes an inorganic oxide, aluminosilicates including ZSM-5, an X-type zeolite, a Y-type zeolite, a USY-zeolite, mordenite, faujasite, nano-crystalline zeolites, MCM mesoporous materials, SBA-15, a silico-alumino phosphate, a gallium phosphate, a titanophosphate or molecular sieve, metal loaded aluminosilicate, or combinations thereof, wherein the catalyst is configured to scavenge chlorides and enhance production of straight chain hydrocarbons over branched hydrocarbons.

All embodiments described above and herein can be combined in any manner unless expressly excluded.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of processing a plastic, the method comprising:

depolymerizing a plastic at a depolymerization temperature sufficient to produce a hydrocarbonaceous wax stream; and cracking the hydrocarbonaceous wax stream in the presence of a cracking catalyst under cracking conditions sufficient to produce a hydrocarbonaceous product stream comprising at least a partially depolymerized plastic;

wherein the cracking conditions include a cracking temperature that is lower than, or the same as the depolymerization temperature;

wherein components in the hydrocarbonaceous product stream have an average molecular weight of at least 3 times lower than the average molecular weight of the depolymerized components in the hydrocarbonaceous wax stream;

wherein the cracking catalyst comprises an aluminosilicate zeolite, a metal loaded aluminosilicate, a metal naphthenate, a metal octanoate, or combinations thereof;

wherein the catalyst scavenges chlorides and enhances production of straight chain hydrocarbons over branched hydrocarbons.

2. The method of claim 1, wherein the hydrocarbonaceous wax stream has an average molecular weight of at least 20 times lower than the average molecular weight of components of the plastic.

3. The method of claim 2, wherein the hydrocarbonaceous wax stream has an average molecular weight of 20 to 50 times lower than the average molecular weight of components of the plastic.

4. The method of claim 1, wherein the hydrocarbonaceous product stream has a boiling point lower than 800° C.

5. The method of claim 4, wherein the hydrocarbonaceous product stream comprises at least one of paraffins, isoparaffins, olefins, naphthenes, aromatic hydrocarbons, or combinations thereof.

6. The method of claim 1, wherein the depolymerizing step is conducted in a continuous feeding device.

7. The method of claim 6, wherein the continuous feeding device is operated at a residence time of less than 1 hour.

8. The method of claim 6, wherein the continuous feeding device comprises an extruder, an auger, a screw feeder, a piston in a feed chamber, a block and feed type manifold, or combinations thereof.

9. The method of claim 8, wherein the continuous feeding device is equipped with (1) automated valving configured for gas pressurized discharge being operated in a timer-based pulse mode for mimicking continuous feeding, and/or (2) heater control means disposed along the length thereof.

10. The method of claim 9, wherein the continuous feeding device includes a devolatization extruder comprising gas withdrawal pipelines with heater control means disposed along the length thereof, wherein the withdrawal pipelines are in fluid communication with one or more condensers configured to condense gas product from the extruder.

11. The method of claim 1, wherein the depolymerization temperature is in a range of 300 to 500° C., and the catalytic cracking temperature is in a range of 250 to 400° C.

12. The method of claim 1, further comprising:

feeding the hydrocarbonaceous product stream into a steam cracking unit;

steam-cracking the hydrocarbonaceous product stream to produce olefins and aromatics.

13. The method of claim 1, wherein the cracking catalyst comprises an inorganic oxide, aluminosilicates including ZSM-5, an X-type zeolite, a Y-type zeolite, a USY-zeolite, mordenite, faujasite, nano-crystalline zeolites, MCM mesoporous materials, SBA-15, a silico-alumino phosphate, a gallium phosphate, a titanophosphate or molecular sieve, or combinations thereof.

14. The method of claim 13, wherein the cracking catalyst comprises Mg, Ni, Co, a transition metal, or combinations thereof.

* * * * *